Oct. 12, 1965

A. SPAAK ETAL 3,211,605

FOAMED PRODUCT AND PROCESS

Filed Jan. 14, 1963

ALBERT SPAAK
CLIFFORD L. WEIR
INVENTORS

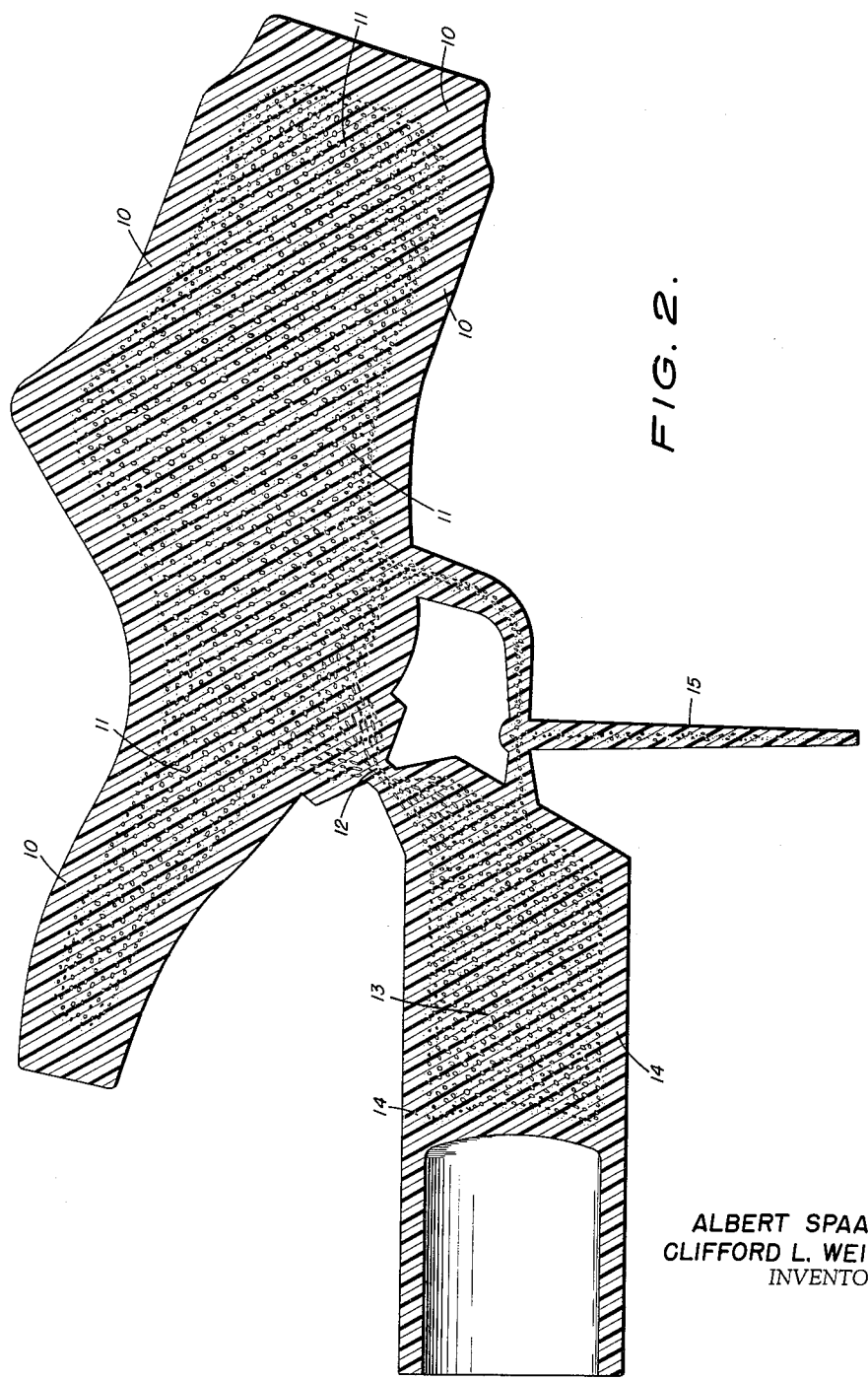

3,211,605
FOAMED PRODUCT AND PROCESS
Albert Spaak, Little Falls, and Clifford L. Weir, Wayne, N.J., assignors to W. R. Grace & Co., a corporation of Connecticut
Filed Jan. 14, 1963, Ser. No. 251,256
8 Claims. (Cl. 161—43)

The present invention relates to a novel and useful foamed product and to a process for preparing such a product. More particularly, it relates to a plastic shaped structure having a foamed core with a dense outer layer and to a process of producing such a structure.

It is known in the art that various plastics have high abrasion resistance, good machinability, and accordingly such plastics have found widespread use as a substitute for objects previously fabricated from wood. In many instances, however, such a substitution is not desirable due to particular characteristics which are related to the density of the final product. For example, in the fabrication of bowling pins it is desired that the pin have a specific density and, correspondingly, a specific center of gravity so as to be interchangeable with other pins and give reproducible results game after game. For this reason, the art has generally turned to a hollow bowling pin when they are to be fabricated from plastics since the density of the plastic does not correspond to the density of wood (see U.S. Patent 3,044,777). Hollow pins, however, lack the rigidity of a solid article and are more apt to split in use. It would be highly desirable, therefore, to produce such an article with a hard outer surface and a foamed core so that the density and correspondingly, the center of gravity could be changed so as to be the same as the wood it replaces.

Similarly, in the shoe field, the use of a solid plastic in a shoe last is not entirely satisfactory due to the difference in density between the plastic and wood. While it is true that a shoe last may be made from a foamed material, the bubbles of the foam act as an insulating barrier and it is quite difficult to obtain molded objects from foams without an unduly long molding cycle. Obviously, if a product could be produced which had a hard outer surface giving dimensional stability so that it could be removed from the mold, it would materially reduce the time necessary for molding.

It is an object of the present invention to provide a simple and convenient method of forming a product having a foamed core. Another object is to provide a foamed product having a solid outer layer. A still further object is to provide a foamed product in which the density can be varied. Another object is to provide a process which will allow control of the thickness of the solid outer layer of a foamed product. Other objects will become apparent as the description of the invention proceeds.

These objects are accomplished by the present invention which provides a shaped structure comprising a foamed plastic core covered with an integral substantially unfoamed plastic layer; with said plastic layer being at least ⅛ inch in thickness and having essentially the same chemical composition as the foamed plastic core.

In a preferred embodiment of the present invention, the unfoamed plastic layer is at least about ¼ inch in thickness and more preferably, ⅜ inch or greater in thickness. In a preferred embodiment the plastic employed is a high density (i.e. density at least about 0.940) polyethylene homopolymer or a copolymer of polyethylene containing up to about 10% by weight of another alpha olefin copolymerized with the ethylene.

The present invention also provides a process of forming a shaped structure having a foamed plastic core substantially covered with an essentially unfoamed plastic layer which comprises introducing a molten plastic containing a blowing agent into a mold cavity, cooling the molten plastic in the cavity while maintaining sufficient pressure on the molten plastic core so as to substantially prevent bubble formation in the plastic until it solidifies as an outer layer at least about ⅛ inch in thickness, and thereafter reducing the pressure on the molten plastic core to allow the blowing agent to form a foamed plastic core.

The expression "shaped structure" signifies any structure having the foamed plastic core covered with the unfoamed plastic layer. Of course, the dimensions of the structure must be such that the unfoamed plastic layer is at least about ⅛ inch in thickness and covers the foamed core.

The term "plastic" is used to signify any of the conventional polymeric materials which are thermoplastic and suitable for conventional molding procedures. The term includes polyesters, such as poly(ethylene terephthalate) the polycarbonamides such as 6-nylon and 66-nylon and other such materials as are well-known in the art. A particularly preferred plastic is high density polyethylene (i.e. having a density above about 0.940) homopolymer and copolymers. The preparation of such materials is disclosed in U.S. Patent 2,825,721. However, polypropylene and many other plastics would likewise be operable.

The term "covered" merely signifies that substantially all of the core is surrounded by the unfoamed layer. It is to be understood, however, in order to form the foamed core one or more outlets must be provided to allow expansion of the foam and, correspondingly, these outlets, when severed from the main structure, will show foam in this area. In general, such foamed areas on the final structure will represent less than 20% of the total surface area and in most instances will represent less than 5% of such area.

The term "integral" merely signifies that there is a continuous plastic phase from the unfoamed plastic layer to the plastic core. While in the final molding it may appear that there is a distinct boundary between the foamed core and the outer unfoamed layer, close inspection will show that the structure is actually a single continuous plastic through this boundary from the unfoamed layer to the core. The expression "substantially unfoamed plastic layer" designates that the blowing agent contained in the unfoamed plastic layer has not formed any substantial amount of bubbles. Obviously, if a gas is employed as a blowing agent or if a volative liquid is so employed, the outside layer will contain a small number of bubbles which in general are insignificant with respect to the number and size contained in the foamed core.

The expression "essentially the same chemical composition" is used to signify that the core and the outside layer contain essentially the same plastic and blowing agent. The pressure that is applied to the structure during formation, however, will prevent or retard the decomposition of the blowing agent in the outside layer. When the pressure is released, the core will foam. Correspondingly, the outside layer may contain the blowing agent in an undecomposed form while the core contains the same agent in the decomposed form. For the purpose of this invention, such differences are considered insignificant and correspondingly both the core and the outside layer are considered to have "essentially the same chemical composition."

The expression "blowing agent" is used in its conventional sense to mean any material suitable for incorporation into plastics to form bubbles therein by the application of heat, reduction in pressure and the like as is known in the art. Among the suitable blowing agents which may be used in the practice of the present invention are gases such as nitrogen or the very volatile liquid fluorocarbons such as 1,2-dichloro-tetrafluoroethane and the like. The more preferred blowing agents, however, are the chemical agents which decompose with the liberation of a gas as one of the decomposition products. Such materials include barium azodicarboxate, 4,4' - oxybis-(benzenesulfonylhydrazide), bis-benzenesulfonyl hydrazide, 4,4'-oxybis(benzenesulfonyl semicarbazide), dinitrosopentamethylenetetramine, trihydrazino - sym. - triazine, and 1,1' - azobisformamide. Other blowing agents are disclosed in U.S. Patents 2,532,243, 2,804,435, 2,819,231, 2,927,904, 2,948,664 and others. A particularly preferred blowing agent is azodicarbonamide as disclosed in U.S. Patent 2,804,435.

The invention is hereinafter more fully described by reference to the drawings.

In the accompanying drawings, which illustrate preferred embodiments of the invention:

FIGURE 2 shows in crossection the molded product produced by such a mold.

Figure 1:
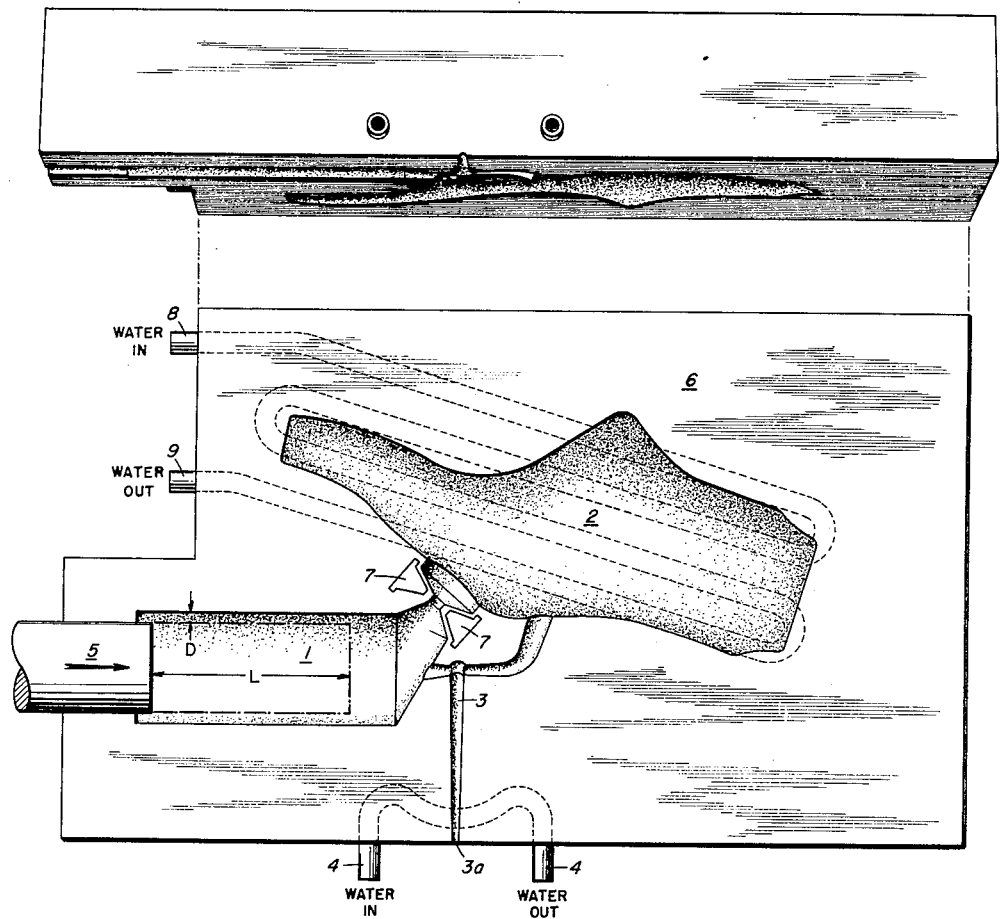
FIGURE 1 shows schematically a two-section partially open mold.

In FIGURE 1, the reservoir 1 is flowably connected to the mold cavity 2 which in turn is flowably connected to the inlet port 3. The body of the mold 6 houses the entire assembly which is divided into two break-away sections although more sections may be used in other types of molds. In operation, the assembled mold is positioned on a conventional injection molding machine and the molten plastic containing the blowing agent is injected through the inlet end 3a of the inlet port 3 to completely fill the mold cavity 2 and the reservoir 1. The inlet port 3 is gradually constricted towards the inlet end 3a so that as a cooling fluid is passed through a cooling means 4 the plastic in the inlet port is solidified to form a plug which resists any pressure transmitted to it from the mold cavity 2. After solidification of the plug, pressure is applied to the plunger 5 while simultaneously cooling the mold cavity 2 by means of a liquid circulating through the inlet 8 and the exit 9.

Sufficient pressure is maintained on the plunger 5 to prevent the blowing agent in the plastic from forming a gas as the outer layer solidifies next to the mold surface. The pressure is maintained in the mold cavity 2 for a sufficient time to allow the outer layer of unfoamed plastic to solidify to a thickness of at least 1/8 inch and preferably 1/4 or 3/8 inch. As soon as the desired thickness is obtained, the pressure is released on the mold cavity 2 by withdrawing the plunger 5 which allows the blowing agent to form gas in the mold cavity and correspondingly expand the plastic back into the reservoir 1. To prevent the plunger 5 from being frozen in the advance position, the distance D is at least 1/16 of an inch, preferably, at least 1/4 inch, along the length of normal movement L of the plunger 5 so that any solidification of the polymer around the walls of the reservoir 1 will not interfere with the advancement or retraction of the plunger 5 during the process. As an optional feature of the invention, the mold is provided with an electrical (or other) heating means 7 for heating the mold in the area adjacent the connection of the reservoir to the mold cavity.

FIGURE 2 shows in crossection the molded product produced by operating in accordance with the present invention. The molded product contains a foamed plastic core 11 which is integrally united with an unfoamed plastic layer 10 which substantially completely surrounds the foamed plastic core. Obviously, while the unfoamed plastic layer 10 is being formed within the mold cavity (after the sprue 15 has been solidified) solidification also takes place in the cylinder so that an unfoamed plastic layer 14 is formed around a foamed core 13. In practice, the foamed core 13 of the cylinder would be unfoamed until the solid outer layer 10 is solidified to the desired extent in the mold cavity. When the desired thickness is reached, pressure is released on the molten polymer containing the blowing agent thereby forming a foamed core 11 by forcing plastic and gas out through the port 12 into the cylinder which is now allowed to expand by the withdrawal of the piston. The resulting product is a foamed plastic core covered with an integral substantially unfoamed plastic layer and it is to be noted that both the core and foam have essentially the same chemical composition.

The following examples are given to illustrate the invention and are not intended to limit it in any manner.

*Example 1*

A mold is constructed as described in the drawing (omitting the heating means 7 as shown) with a mold cavity in the form of a rough shoe last having the approximate shape shown in the drawing. The approximate dimensions of the mold cavity with relation to the molded product, are length (heel to toe) 12½ inches, maximum width (side to side) 4½ inches, maximum height (sole portion to top) 5½ inches, and a thickness (side to side) which varies from 1¼ to 4¼ inches. The reservoir is cylindrical in shape with a length of about 6 inches and a diameter of 2½ inches. The plunger in the reservoir is also cylindrical in shape with a length of about 8 inches and a diameter of 2⅛ inches.

Pellets of a commercial high density polyethylene copolymer (containing about 1% of butene-1) having a density of 0.950 and a melt index of 0.4 are dry blended in a conventional double cone blender with ⅓% by weight of azodicarbonamide ($NH_2.CO.NH.NH.CO.NH_2$) for about 10 minutes.

The high density polyethylene copolymer/blowing agent blend is injected into the above described mold at a temperature of 300° F. employing a pressure of 1900–2000 p.s.i. The inlet port of the mold is immediately cooled with water (2 minutes) to selectively solidify the polymer in this portion of the mold. Refrigerated water is then run through the mold to cool the mold to a temperature of about 20° F. while simultaneously holding the plunger in the advanced position (about 5½ inches forward). Cooling is continued for about 4 minutes and then the plunger is retracted about 5½ inches within the reservoir to compensate for the volume change attending the expansion of the foam as it is formed in the center of the mold cavity.

After approximately 5 additional minutes, at which time substantially complete solidification has taken place, the resulting shoe form is removed from the form. The approximate weight (including the solidified plastic left in the inlet port and around the plunger in the reservoir) is approximately 2.25 lbs. as compared to a solid shoe form which weighs 3.25 lbs. The shoe form can be cut from the excess plastic and is suitable for fabrication into shoe lasts. Upon cutting the shoe form lengthwise through the middle with a saw, the solid outside layer is approximately ½ inch in thickness and appears substantially as shown in the drawing.

*Example 2*

When the procedure of Example 1 is repeated employing 1½% azodicarbonamide and a high density polyethylene homopolymer having a density of 0.960 and a melt index of 5.0, substantially the same results are obtained.

While the amount of blowing agent in the plastic is not critical, it is generally desirable to employ from about 0.05 to about 10% by weight, based on the weight of the polymer, when the blowing agent is a chemical blowing agent. Preferably, from about 0.2 to about 6% by weight of blowing agent is employed. Similarly, the temperatures may be selected as desired, but of course it must be above the softening point of the polymer. For polyethylene homopolymer and copolymers a temperature of from about 270° F. to about 525° F. is suitable with temperatures of from about 270° F. to about 350° F. being preferred. With other polymers, higher or lower temperatures may be desirable.

While the invention has been described with reference to specific embodiments, many equivalent modifications will be apparent to those skilled in the art from a reading of the foregoing without a departure from the inventive concept.

What is claimed:

1. A shaped structure comprising a foamed plastic core substantially enclosed with an integral substantially unfoamed plastic layer; with said plastic layer being at least about ⅛ inch in thickness and having essentially the same blowing agent and plastic as the foamed plastic core.

2. The shaped structure of claim 1 wherein the plastic is a high density polyethylene homopolymer.

3. The shaped structure of claim 1 wherein the plastic layer is at least about ¼ inch in thickness.

4. The shaped structure of claim 1 wherein the plastic layer is at least about ⅜ inch in thickness.

5. A process of forming a shaped structure having a foamed plastic core substantially enclosed within an essentially unfoamed plastic layer which comprises introducing a molten plastic containing a blowing agent into a mold cavity having the size and shape of said shaped structure, cooling the molten plastic in the cavity while maintaining sufficient pressure on the molten plastic core so as to substantially prevent bubble formation in the plastic until it solidifies as an outer layer at least about ⅛ inch in thickness, and thereafter reducing the presure on the molten plastic core to allow the blowing agent to form a foamed plastic core while maintaining a constant mold volume as to the size and shape of said shaped structure.

6. The process of claim 5 wherein the plastic is a high density polyethylene homopolymer.

7. The process of claim 5 wherein the pressure is maintained on the molten plastic core until the outer layer solidifies to a thickness of at least ¼ inch.

8. The process of claim 5 wherein the pressure is maintained on the molten plastic core until the outer layer solidifies to a thickness of at least ⅜ inch.

References Cited by the Examiner

UNITED STATES PATENTS

| | | | |
|---|---|---|---|
| 2,110,470 | 3/38 | Norton | 156—77 X |
| 2,767,436 | 10/56 | Noland et al. | |
| 2,972,780 | 2/61 | Boonstra | 264—328 |
| 3,048,537 | 8/62 | Pall et al. | |
| 3,058,161 | 10/62 | Beyer et al. | 264—47 |
| 3,067,147 | 12/62 | Rubens et al. | 264—53 |
| 3,145,240 | 8/64 | Proulx et al. | 161—161 |

EARL M. BERGERT, *Primary Examiner.*

MORRIS SUSSMAN, *Examiner.*